United States Patent [19]

Fraudin et al.

[11] 4,140,143
[45] Feb. 20, 1979

[54] APPARATUS AND METHOD FOR CONTINUOUSLY MONITORING AND CONTROLLING THE LEVEL OF TAR IN A SETTLING TANK

[75] Inventors: George E. Fraudin, Pittsburgh; Herbert A. Grosick, Gibsonia; Benjamin F. Tatterson, Pittsburgh, all of Pa.

[73] Assignee: Koppers Company, Inc., Pittsburgh, Pa.

[21] Appl. No.: 811,382

[22] Filed: Jun. 29, 1977

[51] Int. Cl.² .............................................. B01D 17/02
[52] U.S. Cl. ......................................... 137/2; 137/172; 210/83
[58] Field of Search ............... 137/172, 173, 403, 406, 137/407, 2; 210/96 R, 526, 83; 73/439, 302, 299

[56] References Cited

U.S. PATENT DOCUMENTS

| | | | |
|---|---|---|---|
| 2,216,724 | 10/1940 | Eddy | 137/172 |
| 2,216,977 | 10/1940 | Mahone | 137/172 X |
| 2,946,443 | 7/1960 | Schmidt | 210/96 X |
| 3,156,116 | 11/1964 | Land | 73/302 |
| 3,200,971 | 8/1905 | Tretheivey | 137/403 X |
| 3,923,659 | 12/1975 | Ullrich | 210/526 X |

*Primary Examiner*—Alan Cohan
*Attorney, Agent, or Firm*—R. Lawrence Sahr

[57] ABSTRACT

An interphase level regulator and method for using it are provided for continuously monitoring and controlling the level of tar in a settling or decanter tank where the tar is separated from an aqueous fluid. The interphase level regulator has an interphase tube vertically positioned inside or outside the settler or decanter tank after an initial separation of tar and aqueous fluid from the emulsion of tar and aqueous fluid. The interphase tube contains one or two pneumatic dip tubes that are supplied with air and yield a different pressure when a change occurs in the level of decanted tar in the interphase tube. The difference in pressure at the dip tube is measured and transmitted to a valve that controls the flow of decanted tar from the settler or decanter tank.

11 Claims, 3 Drawing Figures

APPARATUS AND METHOD FOR CONTINUOUSLY MONITORING AND CONTROLLING THE LEVEL OF TAR IN A SETTLING TANK

BACKGROUND OF THE INVENTION

This invention relates to the separation of tar from aqueous solutions. More particularly, this invention relates to an apparatus, and method for monitoring and controlling the interphase level between the tar and aqueous fluid in a zone for separating the tar and aqueous fluid by settling.

In many installations, tar is separated from aqueous solutions in settling or decanter tanks. In these tanks the tar is separated by manually setting regulators which balance to the height of the regulator the weight of the aqueous phase, tar-water emulsion, and separated tar inside the tank against a weight of a column of tar isolated inside piping connected with the tank. The tar-water emulsion is formed from the contact of aqueous solution with the tar. If it is desirable to increase the removal of tar from the tank, the height of the manual regulator is lowered. If it is desirable to decrease the removal of tar from the tank, and therefore increase the quantity of tar inside the tank, the height of the manual regulator is elevated.

The problem with this manual operation is that a slight change in elevation above or below the desired level disadvantageously affects the operation. These disadvantages include: the accumulation of too much tar, thereby causing tar in the emulsion to be removed from the tank along with the aqueous fluid; or the removal of too much tar, thereby causing tar with a high moisture content, emulsion and possibly aqueous fluid to be removed from the tank with the tar. In addition, the tar in the tank has a constantly changing specific gravity because of the change in moisture content of the tar during settling. The constantly changing specific gravity of the tar with the resulting changes in tar level inside the tank makes the control of the tar flow from the tank very difficult. Frequent adjustments of the manual regulator are required to prevent the discharge of excessive quantities of tar with a high moisture content or emulsion or possibly aqueous fluid into the tar dehydrating system. The presence of emulsion or aqueous fluid in the exit tar from the decanting tank contaminates the tar. The aqueous fluid contains dissolved compounds and the presence of excess aqueous fluid in the exit tar from the decanter tank carries the dissolved compounds which decompose during distillation of the tar. This decomposition causes damage to the distillation equipment and troublesome accumulation of solids in the condensing equipment.

Many apparatus and methods are known in the art for regulating the level of fluid within a vessel. These apparatus and methods include the use of float valves, gamma ray detectors, thermal cables, wire coils and differential pressure meters. Attempts to use these apparatus in regulating the level of tar in contact with an aqueous fluid in a settling or decanting tank have not been wholly successful due to a number of factors. A recent attempt involved the use of differential pressure meters in a coal tar decanting tank. This attempt consisted of having two pneumatic dip tubes positioned vertically in the decanter tank before an initial separation of tar and aqueous fluid from the emulsion. One dip tube was positioned in the aqueous fluid and the other dip tube was positioned in the tar layer beneath the aqueous fluid layer and water-tar emulsion layer. These dip tubes were connected to pressure gauges which indicated the difference in pressure whenever the tar level rose or fell. A signal was generated from the difference in pressure and was transmitted to a control valve that increased or decreased the flow of tar from the decanter in relation to an increase or decrease in the tar level within the decanter. The apparatus and method of this attempt failed to perform satisfactorily because the presence of a large amount of tar-aqueous fluid emulsion near the dip tubes prevented the establishment of a tar-aqueous fluid interphase. This resulted in the presence of tar in the aqueous fluid or some aqueous fluid in the exit tar from the decanter.

It is an object of the apparatus and method of this invention to provide continuous automatic monitoring and control of the level of tar in a new or existing settler or decanter tank installation.

SUMMARY OF THE INVENTION

In accordance with the present invention, an apparatus and method are provided for continuously monitoring and controlling the level of tar in a settling or decanter tank wherein the tar is in contact with an aqueous fluid and/or a tar-aqueous fluid emulsion.

The apparatus of the present invention comprises: an interphase tube vertically positioned after an initial separation of tar, and of aqueous fluid, from a mixture of tar, aqueous fluid and tar-aqueous-fluid emulsion to limit the amount of emulsion present and in contact with decanted tar before it flows into an exit conduit from the settler or decanter; one or two pneumatic dip tubes vertically positioned inside the interphase tube to sense a difference in pressure caused by the changing level of the tar in the interphase tube; a means for measuring the difference in pressure as sensed by one or two dip tubes; a means for transmitting a signal corresponding in magnitude to the pressure difference measured by the measuring means; and a control means for receiving the signal and correspondingly increasing or decreasing the flow of the decanted tar from the settler or decanter.

The interphase tube can be placed inside or outside the settler or decanter and in direct or indirect contact with the decanted tar as it flows from the settler or decanter. The interphase tube can contain only decanted tar or the interphase tube can contain decanted tar and aqueous fluid. In the latter case an interphase level is formed which moves up or down depending on the amount of undecanted tar in the settler or decanter. When only decanted tar is present in the interphase tube, the pneumatic dip tube senses the change in pressure due to the change in level of the decanted tar. When both decanted tar and aqueous fluid are present in the interphase tube, the pneumatic dip tube senses the change in pressure due to the change in level of the interphase between tar and aqueous fluid. The specific gravity of the tar in the settler or decanter changes depending on the settling time inside the settler or decanter. As the settling time varies the amount of tar in the settler or decanter varies thus raising and lowering the height of the interphase level of tar and aqueous fluid in the interphase tube.

Although one pneumatic dip tube serves to sense the change in pressure caused by the change in the decanted tar level in the interphase tube, a second pneumatic dip tube can be used to refine the sensing of the change in pressure. The second dip tube is shorter than the first dip tube. The second dip tube is used in an interphase tube containing both tar and aqueous fluid, and it extends only a short distance into the aqueous fluid above the maximum height that the interphase level might achieve. This is opposed to the first dip tube which extends into the decanted tar a distance greater than the minimum height that the interphase level might achieve.

When the interphase tube is used with both decanted tar and aqueous fluid, it is constructed to maintain a fairly constant upper level of aqueous fluid. Aqueous fluid in the settler or decanter after initial separation is conveyed to the interphase tube and enters the tube a distance above the interphase level. This distance is that which is necessary to conform with the level of aqueous fluid in the settler or decanter tank and to avoid disruption of the interphase level due to the addition of the aqueous fluid. The interphase tube also has an exit orifice by which excess aqueous fluid leaves the interphase tube, thereby maintaining a fairly constant upper level of aqueous fluid. When the interphase tube is external to the settler or decanter tank, the interphase tube has one conduit for conducting aqueous fluid to the interphase tube and a second conduit for conducting aqueous fluid from the interphase tube back to the settler or decanter.

The measuring means and transmittal means may be one instrument performing both of these functions or they may be separate instruments for each function. The control means may communicate with the transmitting means pneumatically, electrically, mechanically or hydraulically.

The method of the present invention includes: placing an interphase tube vertically in contact with decanted tar as it flows from the settler or decanter tank into and exit conduit after being separated initially from aqueous fluid and/or a tar-aqueous fluid emulsion; placing in the interphase tube one or two pneumatic dip tubes to extend into the interphase tube so that one dip tube extends into the decanted tar present in the interphase tube; supplying air to the one or two pneumatic dip tubes at such a rate that there is little agitation of the surrounding decanted tar; measuring the difference in pressure of the dip tube when the level of the decanted tar changes; and controlling a valve through which the decanted tar must pass upon leaving the settler or decanter tank area correspondingly with the change in pressure so that, when the difference in pressure increases, the valve increases the flow of decanted tar from the settler or decanter tank and, when the difference in pressure decreases, the valve decreases the flow of decanted tar from the settler or decanter tank.

BRIEF DESCRIPTION OF THE DRAWINGS

The invention is further set forth in the following detailed description taken in conjunction with the appended drawings in which.

DETAILED DESCRIPTION OF THE INVENTION

Figure 1:
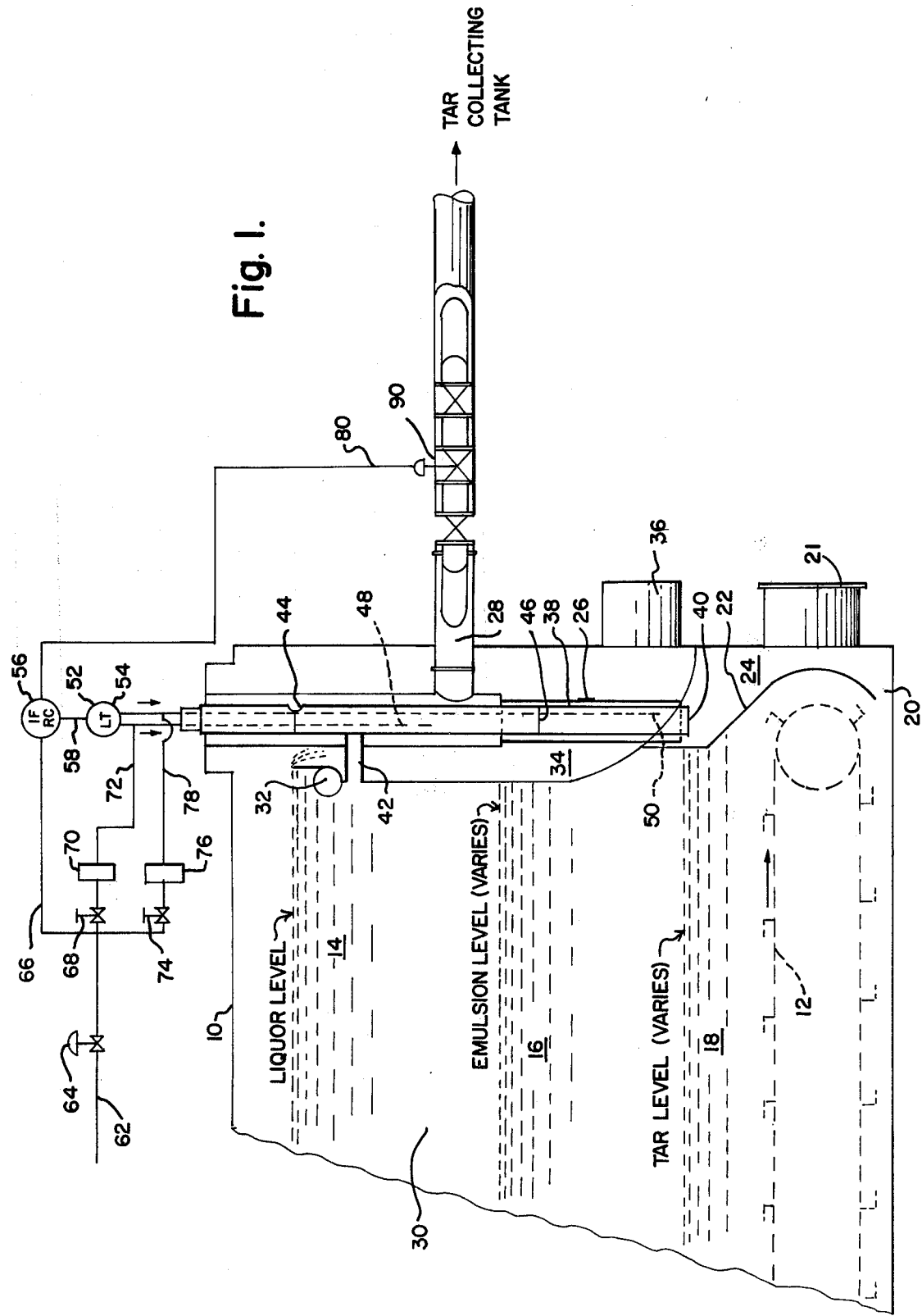
FIG. 1 is a truncated view of a decanter tank with the internal application of the interphase regulator wherein the interphase tube contains decanted tar and aqueous fluid.

Referring now to FIG. 1, reference numeral 10 designates the end portion of a typical coal tar decanter tank. Although the present invention relates to any settler or decanter tank for tar and an aqueous fluid, the preferred embodiment is illustrated for tar that is coal tar and for aqueous fluid that is aqueous flushing liquor and for a decanter that is a typical coal tar flushing liquor decanter, hereinafter referred to as decanter, but also includes settlers used in a by-product coke plant.

Coal tar and flushing liquor are produced by the destructive distillation of coal in coke ovens. The tar is a heavy, viscous mixture of hydrocarbons having a specific gravity in a range of about 1.1 to about 1.25. Flushing liquor is condensed from the gas leaving the oven after the tar has been separated and it is an aqueous ammonia solution containing equlibrium quantities of ammonia, tar acids, such as phenol, and combined ammonia such as ammonium chloride.

In the destructive distillation of coal in slot type coke ovens (not shown in FIG. 1), hot gases, including water vapor, are driven off the coal. The hot gases are cooled with sprayed, recirculated flushing liquor. Since the flushing liquor is recirculated, it should not contain any tar. The aqueous spray cools the gases and condenses tar, which is insoluble in water. As a result, a two-phase liquid stream containing tar and aqueous flushing liquor is produced and this stream flows by gravity into decanter tank 10. In addition to the tar and flushing liquor in the stream, there are also solid materials like coke breeze and coal particles.

The primary purpose of the decanter tank is to separate tar and flushing liquor by settling, but it must also remove the solid materials. These materials are undesirable in either the tar or the liquor fraction. Consequently, the decanter tank is equipped with a very slowly moving drag scraper containing channel flights. Part of the scraper is shown in FIG. 1 and is referenced by numeral 12. The scraper moves at low speed so as not to interfere with the settling rate of the tar. The scraper disposes of the solid materials by pulling them out of the decanter tank.

Decanter tank 10 is made large enough to provide enough holdup time in the system to allow the tar to settle to the bottom. The flushing liquor separates from the tar with difficulty because of the viscous nature of the tar and because the solid materials present in the tar and flushing liquor act as emulsifying agents leading to the formation of an emulsion layer. In the decanter 10, the flushing liquor is the top layer 14, and the emulsion layer is the middle layer 16, and the tar is the lower layer 18. The emulsion layer varies in thickness and in composition from the bottom of the liquor layer 14 to the top of the tar layer 18. The specific gravity of the tar layer varies from tar with high moisture content and resulting low specific gravity at the top of the tar level to tar with low moisture content and higher specific gravity at the bottom of the tar layer. Therefore, greater tar residence periods in decanter 10 produces a tar with higher specific gravity and lower moisture content.

The heavier, drier, decanted tar from the bottom of the decanter tank 10 flows through tar outlet 20 under sluice gate 22 into tar compartment 24. This compartment is separated from the general decanter compartment 30 and only communicates with it through tar outlet 20. The decanted tar flows through riser pipe 26 and out of the decanter tank by tar exit pipe 28 which conveys the decanted tar to a collecting tank (not shown). In the tar compartment area the decanter may contain a manhole 21 for cleaning or emergency purposes.

The aqueous flushing liquor 14 is removed from the general decanter compartment 30 over weir 32. The liquor falls into exit compartment 34 and leaves decanter 10 by liquor outlet 36. This liquor then can be recirculated to cool gases from the coke oven.

In order to obtain a tar with a desired moisture content and a flushing liquor that is free of any emulsion, the level of tar in the general decanter compartment, which is continuously being filled by gravity, must be monitored and controlled.

This monitoring and control is obtained by the use of the present invention. An interphase tube 38 is vertically positioned beside riser tube 26 extending through exit compartment 34 and opening into the tar compartment 24. This interphase tube is made of any material known by those skilled in the art to be compatible with the decanting operation. Preferably the tube is constructed of carbon steel. The interphase tube 38 receives decanted tar from tar compartment 24 by tar inlet 40. The interphase tube also optionally and preferably receives flushing liquor from the general decanter compartment 30 via conduit 42 which is located below weir 32. To maintain an approximately constant upper level of flushing liquor in interphase tube 38 and to keep the tube free from fouling, the tube has a liquor exit 44 above the liquor entrance 42 which empties into exit compartment 34. Where the decanted tar and flushing liquor meet in interphase tube 38 they form an interphase level 46. This interphase level moves up and down as the tar level in the decanter tank varies. This interphase level should not rise to a point corresponding to an increase in tar level in the general decanter compartment where the flushing liquor begins to carry part of the emulsion over weir 32. The interphase level should not fall below the tar inlet 40 at which point flushing liquor would flow into tar compartment 24, and possibly into riser pipe 26, and contaminate the decanted tar leaving the decanter by tar exit pipe 28.

In order to measure the rising and falling of the tar layer in the general decanter compartment by the rise and fall of interphase level 46, it is preferred that two pneumatic dip tubes be positioned vertically in interphase tube 38. Pneumatic dip tube 48 is positioned above the maximum elevation of interphase level 46. This way, dip tube 48 is always releasing air into flushing liquor. Pneumatic dip tube 50 is positioned below the minimum elevation of interphase level 46. This way, dip tube 50 is always releasing air into decanted tar. The maximum and minimum elevations of interphase level 46 are those discussed above, but these can be modified to any lesser maximum and/or minimum level of tar in the general decanter compartment 30. Preferably, the interphase level 46 is half way in between the end of dip tube 48 and the end of dip tube 50 when the tar level in the general decanter compartment is that at which volume of tar fills half of the volume of that compartment. The pneumatic dip tubes may be constructed by any method and by any material known to those skilled in the art to be compatible with the settling operation and are preferably constructed of stainless steel.

The interphase tube 38 extends to the top of decanter 10. Pneumatic dip tubes 48 and 50 continue out of the decanter 10 to a differential pressure measuring means 52 and level transmitter means 54. Measuring means 52 and transmitter means 54 are connected to the interphase recording controller 56 by impulse line 58. The interphase recording controller 56 is connected mechanically to the control valve 90 to enable the controller to position control valve 90 to increase or decrease the flow of decanted tar from the decanter. The impulse from the measuring means may be sent to the control valve in a manner other than mechanically, for example, since an air supply is available, it may be by the use of air pressure.

The air supply may be provided to the system in any manner known to those skilled in the art. Preferably air is supplied by air supply line 62 through pressure controller 64 through pipe 66 to interphase recording controller 56, and through a needle valve 68, which acts as a metering device, and flow indicator 70 and pipe 72 to dip tube 48 and through needle valve 74, which acts as a metering device, and flow indicator 76 and pipe 78 to dip tube 50. The change in pressure is transmitted mechanically from interphase recording controller 56 via mechanical linkage 80 to control valve 90.

The air flowing into dip tubes 48 and 50 exits from the bottom of the tubes and is vented from the interphase tube 38 where it is discharged through a conventional vent (not shown). A greater pressure is needed in tube 50 than in tube 48 to force the air from the dip tube. The rate at which air leaves the dip tubes is a minimum flow such that it does not cause agitation or disruption of the interphase level 46. Also, the flow of air in the dip tubes must be sufficient to keep the liquids from entering the dip tubes. But the flow of air must not be too great to produce measurable pressure drops of their own. The pressure needed on tube 50 will increase as interphase level 46 moves upward and will decrease as the interphase level 46 moves downward. Needle valve 74 will allow a greater or lesser pressure to force the same volume of air down dip tube 50 as the interphase level increases or decreases. The varying pressure in dip tube 50 is measured against the constant pressure of tube 48 by the differential pressure measuring means 52 and level transmitter 54. These devices may be separate or common devices. From level transmitter 54 and impulse is transmitted through line 58 to the interphase recording controller 56. This controller produces a responding signal through linkage 80 to flow control valve 90. If the interphase level 46 moves upwards because of an increase in level of the tar in the general decanter compartment 30, over that for which the interphase level is originally set, there is an increase in pressure in tube 50. The differential pressure measuring device 52 measures the signal, and level transmitting device 54 amplifies the signal to interphase recording controller which mechanically actuates control valve 90 via linkage 80, to increase the opening of valve 90 to increase the tar flow which will tend to lower the interphase level 46. Conversely, if the interphase level moves downward, the pressure in tube 50 will decrease and the controller will decrease the opening of flow control valve 90, thereby decreasing the flow of tar from the decanter.

The differential pressure measuring means, level transmitting means, interphase recording controller and control valve may be those devices known to those skilled in the art to fulfill these functions. Examples of a differential pressure measuring means and transmitting means which may be used in this invention as furnished from Foxboro Company, Foxboro, Massachusetts, are Model 9 float type combined pressure measuring and transmitting means, a 15 series d/p cell combined pressure measuring and transmitting means, and Model 37 Bellows Element level transmitter or Model 9 float-and-cable type level transmitter. Examples of interphase recording controllers that can be used in the present invention include: Model 40 and Model 43 pneumatic controllers manufactured by Foxboro Company, Foxboro, Mass. The flow control valve can be designed with a safety feature to close to a minimum position in the event of the loss of air pressure. An example of such a flow control valve that may be used in the present invention is Fisher Governor Company butterfly valve.

Figure 2:
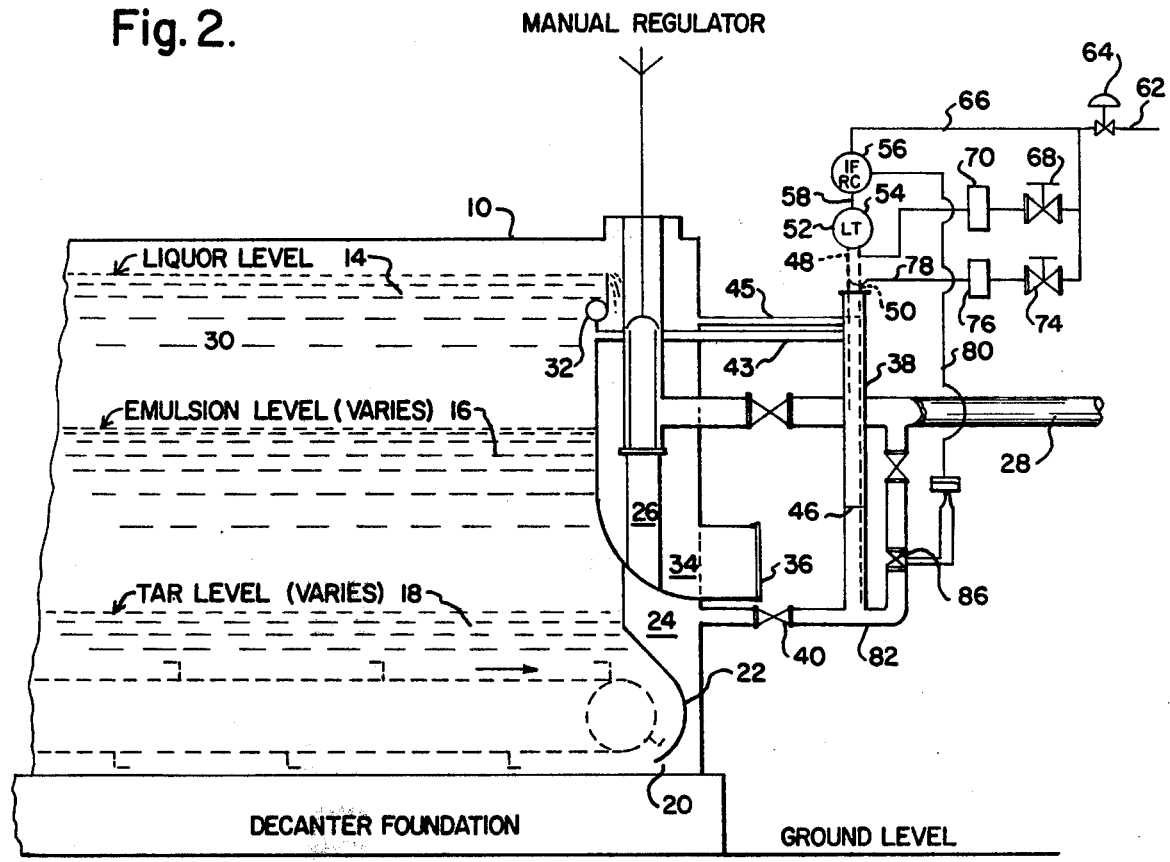
FIG. 2 is a truncated view of a decanter tank with the external application of the interphase regulator wherein the interphase tube contains decanted tar and aqueous fluid.

FIG. 2 depicts an external application of the interphase regulator wherein the interphase tube is mounted outside the decanter. The interphase tube 38 is connected outside the decanter 10 to the tar compartment 24 by conduit 82. The decanted tar flows out of the tar decanting compartment through conduit 82 and through control valve 86 to tar exit 28. The interphase tube also receives aqueous flushing liquor from the general decanter compartment 30 via conduit 43 which is located to conduct liquor around the overflow weir 32 and preferably below overflow weir 32. To maintain an approximately constant upper level of flushing liquor in the interphase tube 38 and to keep the tube free from fouling, as in FIG. 1, the interphase tube 38 has an exit for the flushing liquor. This exit is conduit 45 which is located above the liquor entrance 43 and which conveys the liquor to exit compartment 34.

In the interphase tube 38 there are located two pneumatic dip tubes 48 and 50 positioned vertically in the interphase tube. Pneumatic dip tube 48 extends a short distance into the interphase tube while pneumatic dip tube 50 extends a greater distance into the interphase tube. Either dip tube may be the short or long dip tube as long as the longer dip tube extends into the interphase tube a sufficient distance below the minimum elevation of the interphase level so as to always release air into decanted tar. The shorter dip tube is positioned above the maximum elevation of interphase level 46 so as always to release air into flushing liquor. Dip tubes 48 and 50 are connected to a differential pressure measuring means 52 and level transmitter means 54. Preferably the functions of these two devices are combined in one device. The measuring means and transmitter means are connected to the interphase recording controller 56 by impulse line 58. The interphase recording controller and dip tubes are supplied by air in the same manner as in the internal application of the interphase regulator depicted in FIG. 1. The interphase recording controller 50 is mechanically connected with control valve 86 by linkage 80.

The air flowing into dip tubes 48 and 50 exits from the bottom of the tubes and floats upwards and is vented out the top of the interphase tube. A greater pressure is needed in tube 50 than in tube 48 to force the air from the dip tube. The rate at which the air leaves the dip tubes is such that it does not cause too much agitation of the interphase level. As in the internal application of the interphase regulator, when the interphase level moves up the interphase tube from its original position, increased pressure relative to the pressure in tube 48 must be used to move the air through dip tube 50 into the decanted tar. Also, when the interphase level moves down the interphase tube below its original position, less pressure is needed to move air down tube 50 relative to the pressure needed to move air down tube 48. The original position of the interphase level corresponds to the standard differential pressure which is the difference in pressure between tubes 48 and 50 when the interphase level is at a point in the interphase tube that corresponds to the tar level in the decanter tank 10 being at a position where the tar volume fills approximately half the volume of the decanter tank 10. The interphase regulator has enough variability so that the standard differential pressure can be set for any desired tar volume in the decanter tank 10.

In the same manner as in FIG. 1, the difference in pressure between the two dip tubes actuates the opening or closing of valve 86 to allow more or less tar to flow into the tar exit pipe 28. When the differential pressure decreases from the standard differential pressure, then the valve opening decreases to allow less tar to leave the decanter to provide a longer settling time to decrease the moisture content of the tar. If the differential pressure increases over the standard differential pressure, the valve 86 opening is increased to allow more tar to flow through the tar exit pipe 28 out of the decanter.

Figure 3:
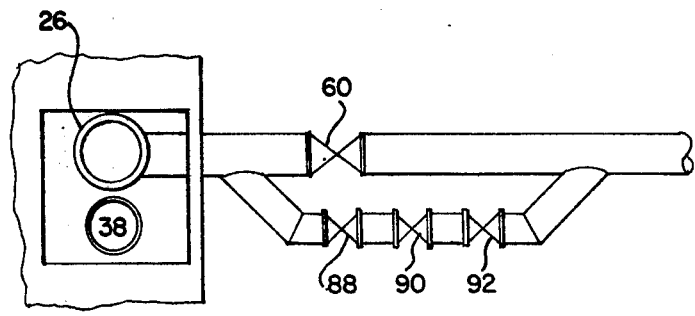
FIG. 3 is a top view of the interphase tube of FIG. 1 positioned beside the riser pipe through which the decanted tar exits the settler or decanter.

Referring to FIG. 3, there is shown a top view of the interphase tube 38 as it is located beside the riser pipe 26 in FIG. 1 with the preferred series of valves for FIG. 1. The tar exit pipe 28 extends from the riser pipe 26 and preferably contains manual control valve 60 and shutoff valves 88 and 92 and control valve 90. The manual and shutoff valves are provided in case control valve 90 should cease to function for a period of time. By using these valves, the tar-flushing liquor decanting can continue. These valves need not be present and the manual valve could be adapted to be the control valve, as in FIG. 1.

The apparatus and method of the interphase regulator of this invention allows the continuous and automatic operation of a settler or decanter for separating tar from an aqueous fluid. The regulator of this invention overcomes the difficulties of manual regulation of the rate at which the tar flows from the settler or decanter. These disadvantages being the presence of tar in aqueous fluid or aqueous fluid in tar and the necessity of the operator to watch and to control the tar flow.

According to the provisions of the patent statutes, the principle, construction and mode of operation have been explained and what is considered to represent its best embodiment has been illustrated and described. However, it should be understood that within the scope of the appended claims, the invention may be practiced otherwise than as specifically illustrated and described.

We claim:

1. A method for monitoring and controlling the interphase level between tar and aqueous flushing liquor in a decanter tank, comprising:
   (a) placing an interphase tube vertically in communication with the tar compartment of the decanter;
   (b) placing one dip tube in the interphase tube in such a manner that it is in contact with the decanted tar in the tube when the decanted tar is at its lowest level;
   (c) supplying said dip tube with air in an amount equivalent to the depth of the decanted tar;
   (d) measuring the difference in pressure needed in the dip tube to force air through the dip tube when the interphase level of decanted tar and aqueous flushing liquor moves up or down with a differential pressure element that sends a signal corresponding to this pressure difference;
   (e) amplifying the signal; and (f) controlling a valve corresponding to the change in pressure so that when the interphase level rises the valve opens to allow the increased flow of decanted tar from the decanter tank and when the interphase level falls the valve closes to decrease the flow of decanted tar from the decanter tank.

2. Method according to claim 1 wherein the measured differential pressure signal is amplified.

3. Apparatus for continuously monitoring and controlling the volume flow of coal tar from a tar settling and decanting tank, wherein aqueous flushing liquor, produced by the distructive distillation of coal in coke ovens, bearing coal tar, is deposited, comprising:

(a) means for drawing off decanted tar from adjacent the bottom of said tank after settlement thereon of said decanted tar;

(b) tar compartment means for containing said decanted tar separated from said tank but at a general vertical level with said tank to allow said decanted tar to seek a level within said tar compartment means produced by the head pressure of said aqueous flushing liquor in said tank;

(c) columnar means for separating a portion of said decanted tar, from said tar compartment means, into a vertical column, said decanted tar within said columnar means being in free association with and forming a continuum thereof said decanted tar in said tar compartment means;

(d) means for separating said aqueous flushing liquor from the upper liquid surface of the content of said tank;

(e) liquor compartment means for holding said aqueous flushing liquor, so separated from said upper liquid surface of said content of said tank, such that the surface level of said aqueous flushing liquor within said liquor compartment is generally equal with the level of said upper liquid surface of said content of said tank;

(f) means for superimposing aqueous flushing liquor from adjacent said upper liquid surface of said content of said tank, onto said decanted tar within said columnar means, thus forming an interphase therebetween;

(g) means, operative on said columnar means, to equate the level of said aqueous flushing liquor within said columnar means with said surface level of said aqueous flushing liquor within said liquor compartment means;

(h) first tubular means, extending into said columnar means, to a point below said interphase, and opening into said decanted tar within said columnar means;

(i) second tubular means, extending into said columnar means to a point above said interphase means, and opening into said aqueous flushing liquor within said columnar means;

(j) means for introducing and maintaining sufficient air pressure into said first tubular means such that said air pressure slightly exceeds the equalibrium pressure required to prevent said decanted tar from entering said first tubular means;

(k) means for introducing and maintaining sufficient air pressure into said second tubular means such that said air pressure slightly exceeds the equalibrium pressure required to prevent said aqueous flushing liquor from entering said second tubular means;

(l) means for continuously measuring the difference between the air pressure introduced into said first tubular means and the air pressure introduced into said second tubular means;

(m) means for recording said air pressure difference so measured;

(n) control means for releasing variable quantities of decanted tar from said tar compartment means such that said air pressure difference is maintained within a predetermined range; said control means which is operative of said means for drawing off said decanted tar from adjacent the said bottom of said tank, correspondingly variable in quantity to said variable quantities of decanted tar released from said tar compartment means by said control means.

4. The invention described in claim 3 wherein said columnar means comprises an interphase tube.

5. The invention described in claim 3 wherein said columnar means is positioned partially in said tar compartment means, and partially in said liquor compartment means, said liquor compartment means being positioned vertically above said tar compartment means and separated therefrom.

6. The invention described in claim 3 wherein said columnar means is positioned separate from both said tar compartment means and said liquor compartment means.

7. The invention described in claim 3 wherein said first tubular means is a first drip tube and said second tubular means is a second drip tube.

8. The invention described in claim 3 wherein said means for continuously measuring is a differential pressure cell.

9. The invention described in claim 3 wherein said control means includes a mechanically actuated control valve and means for transmitting mechanical motion to said control valve which actuated said control valve.

10. The invention described in claim 3 further comprising a removal port positioned in said columnar means whereby the aqueous flushing liquor within said columnar means is maintained at an approximately constant upper level by a removal port in said columnar means.

11. A method for continuously monitoring and controlling the volume flow of coal tar from a tar settling and decanting tank, wherein aqueous flushing liquor, produced by the distructive distillation of coal in coke ovens, bearing coal tar, is deposited, comprising:

(a) drawing off decanted tar from adjacent the bottom of said tank after settlement thereon of said decanted tar;

(b) containing said decanted tar separated from said tank but at a general vertical level with said tank to allow said decanted tar to seek a level produced by the head pressure of said aqueous flushing liquor in said tank;

(c) separating a portion of said decanted tar into a vertical column;

(d) separating said aqueous flushing liquor from the upper liquid surface of the content of said tank;

(e) holding said aqueous flushing liquor, so separated said upper liquid surface of said content of said tank, such that the surface level of said separated aqueous flushing liquor is generally equal with the level of said upper liquid surface of said content of said tank;

(f) superimposing aqueous flushing liquor, from adjacent said upper liquid surface of said content of said tank, onto said decanted tar within said vertical column, thus forming an interphase therebetween;

(g) equating the level of said aqueous flushing liquor within said vertical column with said surface level of said separated aqueous flushing liquor;

(h) extending first tubular means into said vertical column to a point below said interphase;

(i) extending second tubular means into said vertical column to a point above said interphase;

(j) introducing and maintaining sufficient air pressure into said first tubular means such that said air pressure slightly exceeds the equalibrium pressure required to prevent said decanted tar from entering said first tubular means;

(k) introducing and maintaining sufficient air pressure into said second tubular means such that said air pressure slightly exceeds the equalibrium pressure required to prevent said aqueous flushing liquor from entering said second tubular means;

(l) continuously measuring the difference between the air pressure introduced into said first tubular means and the air pressure introduced into said second tubular means;

(m) recording said air pressure difference so measured;

(n) releasing variable quantities of decanted tar such that said air pressure difference is maintained within a predetermined range.

* * * * *